March 7, 1950 E. UTTERBACK 2,499,703
HEATER
Filed April 30, 1946 3 Sheets-Sheet 2
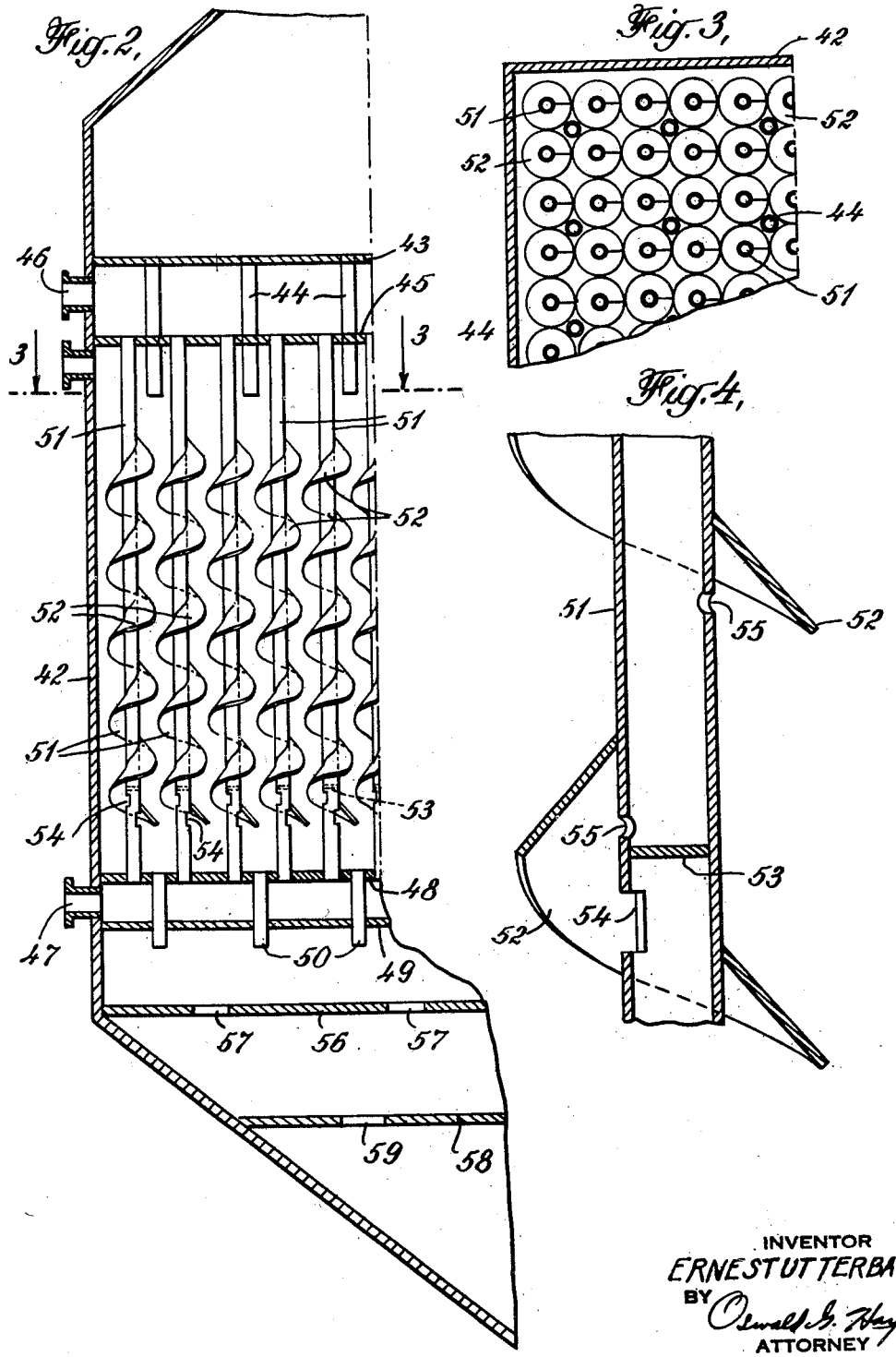
INVENTOR
ERNEST UTTERBACK
BY
ATTORNEY March 7, 1950 — E. UTTERBACK — 2,499,703
HEATER
Filed April 30, 1946 — 3 Sheets-Sheet 3

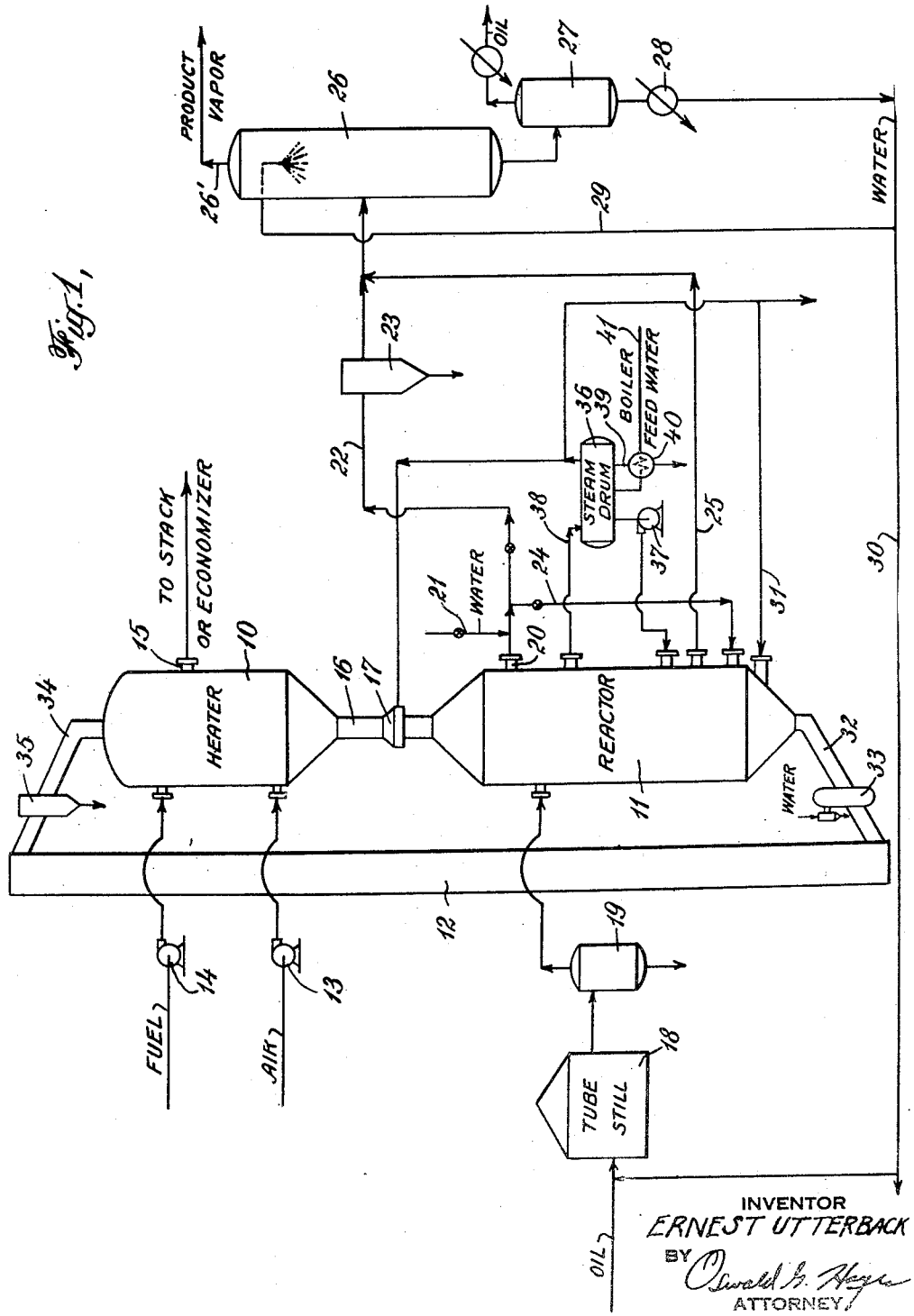

INVENTOR
ERNEST UTTERBACK
BY Oswald G. Hayes
ATTORNEY

Patented Mar. 7, 1950

2,499,703

UNITED STATES PATENT OFFICE 2,499,703

HEATER

Ernest Utterback, New York, N. Y., assignor to Socony-Vacuum Oil Company, Incorporated, a corporation of New York Application April 30, 1946, Serial No. 666,053

10 Claims. (Cl. 263—19)

This invention relates to a method and apparatus for efficiently heating granular solids to an elevated temperature. More particularly, the invention is concerned with propagation of a flame through open paths in a moving bed of granular solid while controlling the flame temperature to avoid overheating and fusion of the granular solid at hot spots.

The invention is well adapted to the preparation of highly heated granular solids to be used in promotion of thermal reactions such as the cracking of hydrocarbons at elevated temperatures and short reaction times to produce high yields of olefins. In such processes it is desirable to raise the temperature of the charge very rapidly to that desired for the reaction and thereafter rapidly quench the reaction mixture to inhibit secondary reactions such as condensation of ethylene to produce aromatic hydrocarbons and the like.

In such reactions, the granular solid should be heated to temperatures on the order of 1550° F. and above and unusual problems are presented in efficiently heating solids to such temperatures without damaging the solid itself. In order to operate in heaters of reasonable size with efficiency of utilization of heat generated it is desirable to generate the flame in contact with the solid to be heated. Unless care is exercised the flame temperature may exceed the fusion temperature of the solid employed and thus cause fusion of the solid at localized hot spots. According to the present invention the flame is generated over a relatively long path which is substantially free of solid particles. In order to accomplish this purpose a downwardly moving bed of solid particles is baffled to produce a plurality of tortuous paths which are substantially free of solid particles thus making it unnecessary for the main body of combustion gases to penetrate a mass of solids along the path of flame generation. The flame is generated by interaction of flame components, namely, air and fluid fuel, preferably gaseous fuel; one of which is introduced substantially completely at one end of the path while the other component is introduced in relatively small increments along the baffled tortuous path. By this means the combustion is caused to take place in stages and the flame temperature can be readily controlled so as not to exceed the fusion temperature of the solid.

In a typical embodiment the combustion section is provided by a large number of vertical tubes, each of which is provided with a helical baffle arranged with the upper surface of the baffle sloping downwardly away from the tube surrounded thereby. The tube, in addition to acting as a core for the helical baffle, may also act as a feed inlet for the flame components, a plug being inserted in the tube to provide two feed compartments. Preferably, the upper ends of the helical baffles are considerably below the point at which combustion gases are withdrawn from the heater thus causing the products of combustion to flow directly through the moving bed of particles in the upper portion thereof for more intimate contact with the particles.

The heating flame is thus in contact with a boundary surface of a mass of solids but the main course of the flame does not pass through a body of solids. As the moving bed passes downwardly over the baffles it is continuously mixed, presenting fresh surfaces to direct exposure to the flame and giving rapid equalized heating. In the embodiment shown in the drawings hereof, the tubes for supply of flame components act as preheaters for those flame components and efficient combustion is thereby insured.

The invention is discussed in detail below in connection with a complete process for the conversion of gas oil and other hydrocarbons to ethylene but it will be readily understood that the invention is equally applicable to any process involving the heating of granular solids. The description of this typical specific embodiment makes reference to the annexed drawings wherein Figure 1 is a diagrammatic showing of apparatus for practising the process to which the invention is directed;

Figure 2 is a partial vertical section through a heater;

Figure 3 is a partial section on line 3—3 of Figure 2;

Figure 4 is a detail partial section of the flame producing assembly of Figure 2.

Figure 5:
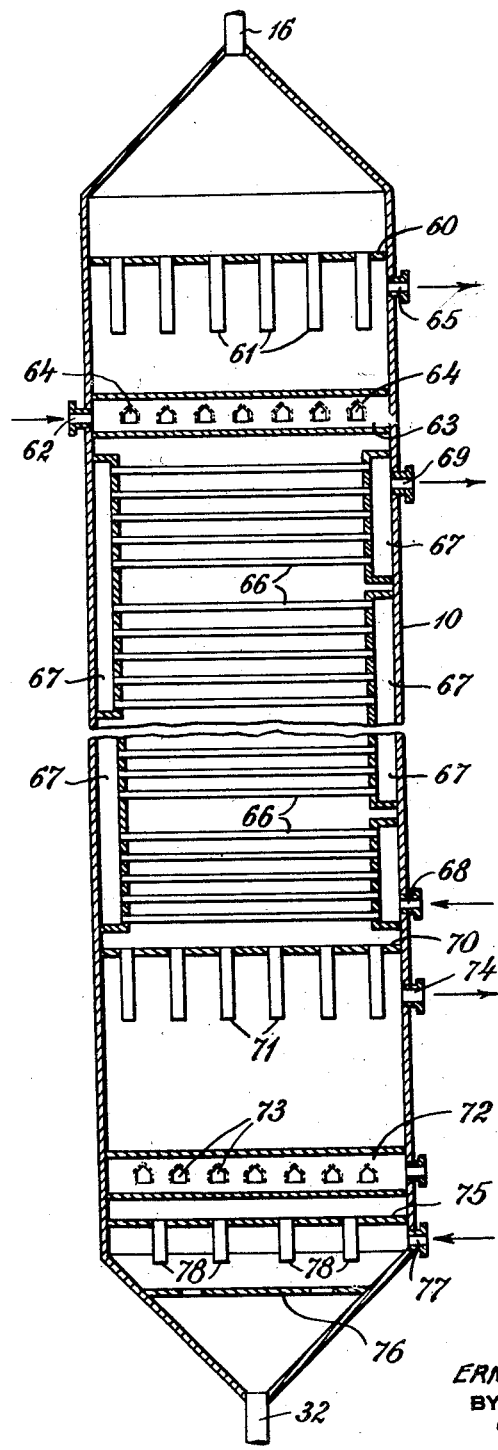
Figure 5 is a vertical section of a suitable reactor.

Referring specifically to Figure 1 a suitable granular solid such as fused alumina pellets having an average diameter of about 0.3 inch is circulated in a closed path including a heater 10, a reactor 11, and an elevator 12. Fuel and preheated air are admitted from pumps 13 and 14 respectively to the heater 10 wherein a flame produced by combustion of the fuel heats the moving bed of granular solids in heater 10, exhaust gases being withdrawn at 15 and passed to a suitable stack or economizer. The highly heated solids flow downwardly through a feed leg 16 through a steam sealing zone 17 to the reactor 11 wherein they are contacted with a fluid charge such as preheated oil vapors from tube still 18 and vapor separator 19. The highly heated vapors are withdrawn at 20 and are then preferably quenched to a temperature which will substantially reduce the reaction velocity by water introduced from line 21.

The apparatus shown here is capable of conducting the major quench by water from line 21 after which the vapors are transferred by line 22 to a tar separator 23, from which the vapors may be conducted to further purification steps as described hereafter in connection with the preferred operation. According to the preferred embodiment the partially quenched vapors are conducted by line 24 to the lower part of the reactor 11 wherein they are passed in direct contact with cold granular solid and are withdrawn by line 25 and transferred to a spray condenser 26 wherein a spray of water or other suitable medium such as cold oil, reduces the temperature of the vapors to a point at which normally gaseous products may be separated from normally liquid materials, say 100° F. The normally gaseous material is withdrawn from condenser 26 by overhead line 27 and passed to a suitable gas plant for recovery and purification of its components. A mixture of water and oil is withdrawn from the bottom of condenser 26 and passed to a settler 27 from which oil is withdrawn, cooled and treated to recover various components such as aromatic gasolines and naphthas. Water withdrawn from the bottom of settler 27 is cooled in heat exchanger 28 and may then be recycled in whole or part for reuse as by line 29 to the spray condenser and line 30 which supplied water to be mixed with the oil and thus furnish steam for the reaction in view of the fact that water vapor aids the course of the reaction.

Returning now to the granular solid cycle, purging steam may be introduced to the bottom of the reactor from line 31 and the purged solids are then transferred by a conduit 32 through a depressuring pot 33 to the elevator 12. From the top of elevator 12, the solids are conveyed by a conduit 34 having a suitable separator 35 for removal of particles which have been broken down to a size smaller than that desired.

The intermediate section of the reactor is provided with heat transfer tubes for passing a heat exchange medium in indirect heat exchange relationship with the granular solids therein. A steam drum 36 supplies water for circulation through the heat transfer tubes by pump 37, vapors generated in reactor 11 being returned to the steam drum by line 38. Process steam may be drawn from the steam drum to supply steam sealing zone 17 and the steam purge line 31, leaving an excess of steam which can be diverted for other plant uses. As shown, blow-down line 39 is equipped with a heat exchanger 40 for preheating boiler feed water from line 41.

The structure of the heater is shown in Figures 2 to 4. A shell 42 is fitted with suitable inlet and outlet means (not shown in Figure 2) to produce a moving bed of granular solids in the heater 10. The granular solids supplied at the top fall onto a tube sheet 43 which defines the lower surface of a feed hopper from which solids are withdrawn by feed pipes 44 for supply to the heating section. A manifold is provided for supplying one of the components of the flame used to heat the solids and, as shown, the manifold is defined by tube sheet 43 and plate 45. A suitable connection 46 is provided for admission of a gas to this upper manifold. A similar manifold, supplied by inlet 47 is defined at the bottom of the heating section by a tube sheet 48 and plate 49. Feed tubes 50 provide for withdrawal of granular solids from the heating section.

The heating section is provided with means for baffling the downwardly moving mass of granular solids in a manner to provide a plurality of continuous paths through the bed, which paths are substantially free of solid particles thus permitting gases to flow in direct contact with solid particles but without forcing their way through a compact bed of particles in the baffled region. Various types of baffles for this purpose are shown in U. S. Patent No. 2,227,416, issued December 31, 1940, to John W. Payne. Although any of the forms of baffling shown in that patent may be used, the helical fin baffle is particularly well adapted to the present purpose and that form is shown herein. The flame components, namely air and fuel, are supplied through the inlets 46 and 47 to the respective manifolds between which extend a number of tubes 51 for supplying the flame components to the heating section. It is desirable that the temperature of the flame produced by combustion of the fuel shall not exceed the fusion temperature of the solid, and, since the flame components are normally preheated before admission at 46 and 47 and, since those components are further preheated by passage through tubes 51, the temperature of the flame is maintained within the desired limits by introducing one of the flame components in relatively small increments thereby permitting dissipation of heat of combustion and giving a partially consumed mixture to which the next increment can be added without producing unduly hot flames.

As shown in the drawings this desirable result is achieved by introducing substantially all of one flame component from orifices in tubes 51 over a relatively short portion of the path defined by helical baffles 52 about the tubes 51. A plug 53 near the bottom of each tube 51 insures that only the lower portion of the tube is open to the lower manifold while the major portion of the tube functions as an inlet from the upper manifold. Large orifices 54 allow all the flame components from the lower manifold to be admitted over a short space of the path beneath the baffle. Above the plug 53 are a large number of smaller orifices 55 which admit the flame component from the upper manifold to the path under the helical baffle in relatively short increments. It is of course possible to introduce either flame component in increments and, as shown here, the air is introduced from the bottom and the fuel is added in small increments along the tortuous path beneath the baffle. Any fluid fuel can be used, but, due to the high temperatures involved, liquid fuels tend to coke in the tubes and plug the orifices 55, for which reason gaseous fuels are much preferred. The highly heated solids are discharged from pipe 50 onto a plate 56 having openings 57 which induce equal flow from the pipes 50 adjacent thereto. Plate 58 having openings 59 functions in a similar manner to control flow from the openings 57 and thus give a constant rate of flow through the heating section.

Turning now to Figure 5, the highly heated solids pass from feed leg 16 into a hopper in the top of reactor 10 defined by a tube sheet 60 from which depend a number of feed legs 61 to give uniform feeding across the top of the reactor. The hydrocarbon charge enters by inlet connection 62 to a header 63 from which extend a plurality of feed troughs 64 open at the bottom. The charge is thus evenly distributed through the mass of hot granular solids and passes upwardly therethrough to the open space about the feed tubes 61 from which it is withdrawn by outlet connection 65. Below the header 63 are banks of heat exchange tubes 66 which communicate with a series of manifolds 67 which induce flow of the heat exchange medium through the tubes in series between inlet 68 and outlet 69. The solids cooled in this manner fall onto a tube sheet 70 from which they pass by feed tubes 71 to the quenching zone wherein they are contacted by the hot reaction mixture supplied through header 72 and distributing troughs 73. The quenched product is withdrawn from the open space about tubes 71 through an outlet connection 74. The bottom of the reactor is provided with flow control plates 75 and 76 similar in function to the elements 48, 56 and 58 of Figure 2. Purge steam is advantageously induced by inlet 77 below plate 75 to an open space provided by tubes 78.

In a typical operation a mixture of steam and gas oil vapor containing about 33% by weight of water is admitted to the top section of the reactor at 625° F. Fused alumina pellets of 0.3 inch average diameter are admitted from the feed leg at 1546° F. at a solids to oil weight ratio of 11.95. The depth of bed contacted by the charge is 24 inches and a space velocity of 3.12 volumes of liquid oil at 60° F. per volume of reaction space per hour is maintained. This gives a mean effective temperature of 1440° F. at a contact time of 0.29 second. The heated reaction mixture is promptly quenched with water to reduce its temperature from 1545° F. to 1200° F. at which temperature it is transferred to the quench section and cooled therein to 572° F. The quenched reaction mixture is transferred directly to the spray condenser wherein it is cooled to 100° F. by contact with water at 90° F. Among the products produced are 28.1% by weight of ethylene together with substantial yields of other olefins. Among the liquid products are 5.5% of depentanized motor gasoline having an end point of 416° F. and an octane number of 94.6 with 3 cc. of tetraethyl lead per gallon.

The granular solid enters the heat exchange section at 1040° F. wherein it generates steam under a pressure of 175 lbs. per square inch gauge and leaves the heat exchange section at 570° F. The granular solid is heated to 765° F. in the quench section and reenters the heater at 730° F. wherein it is heated to 1575° F. for return to the reactor.

I claim:

1. A process for heating a mass of granular solid material which comprises passing said material downwardly through a heating zone as a substantially compact moving bed, effecting generation of flames in said heating zone by the interaction of the flame components air and gaseous fuel, baffling said material moving downwardly through said zone to provide a plurality of tortuous, particle free paths in said zone, admitting one of said flame components to said paths at points adjacent one end thereof, admitting the other of said flame components to said paths in increments along a substantial portion of the length thereof, and removing products of combustion from said zone.

2. A process for heating a mass of granular solid material which comprises passing said material downwardly through a heating zone as a substantially compact moving bed, effecting generation of flames in said heating zone by the interaction of the flame components air and gaseous fuel, baffling said material moving downwardly through a portion of said zone spaced from the top thereof to provide a plurality of tortuous, particle free paths in said zone, admitting one of said flame components to said paths at points adjacent one end thereof, admitting the other of said flame components to said paths in increments along a substantial portion of the length thereof, and removing products of combustion from the top of said zone; the granular solid material in said zone above said portion thereof being unbaffled to thereby provide a section in which products of combustion pass through a compact bed of granular solid material.

3. Apparatus for heating granular solids comprising a vertical shell, an upper tube sheet extending across said shell near the upper end thereof, to provide a feed hopper in the top of said shell, means to admit granular solids to said hopper, an upper gas supply manifold below said tube sheet, a lower tube sheet extending across said shell near the lower end thereof, a lower gas supply manifold below said lower tube sheet, a plurality of gas feed tubes extending between said manifolds, a plug in each of said gas feed tubes in the lower portion thereof to divide said tube into two feed compartments, each communicating with one of said manifolds, a helical baffle about each of said gas feed tubes having its upper surface sloping downwardly away from said gas feed tube, the ends of said helical baffles being spaced a substantial distance from the adjacent ends of said gas feed tubes, at least one orifice in each of said tubes below said plug and under said baffle to admit gas from said lower manifold to the space under the lower ends of said baffles, a plurality of orifices in each of said tubes above said plug spaced along said tubes under said baffles to admit gas from said upper manifold in increments to the space under said baffles, a plurality of granular solid feed tubes depending from said upper tube sheet and having their lower ends spaced among said gas feed tubes intermediate said upper manifold and the upper ends of said baffles, means to withdraw gas from the space within said shell above said lower ends of said granular solid feed tubes, a plurality of granular solid withdrawal tubes depending from said lower tube sheet and means to equalize flow of granular solids from the lower ends of said withdrawal tubes.

4. Apparatus for heating granular solids comprising a vertical shell, an upper tube sheet extending across said shell near the upper end thereof, to provide a feed hopper in the top of said shell, means to admit granular solids to said hopper, an upper gas supply manifold adjacent said tube sheet, a lower tube sheet extending across said shell near the lower end thereof, a lower gas supply manifold adjacent said lower tube sheet, a plurality of gas feed tubes extending between said manifolds, a plug in each of said gas feed tubes in the lower portion thereof to divide said tube into two feed compartments, each communicating with one of said manifolds, a helical baffle about each of said gas feed tubes having its upper surface sloping downwardly away from said gas feed tube, the ends of said helical baffles being spaced a substantial distance from the adjacent ends of said gas feed tubes, at least one orifice in each of said tubes below said plug and under said baffle to admit gas from said lower manifold to the space under the lower ends of said baffles, a plurality of orifices in each of said tubes above said plug spaced along said tubes under said baffles to admit gas from said upper manifold in increments to the space under said baffles, a plurality of granular solid feed tubes depending from said upper tube sheet and having their lower ends spaced among said gas feed tubes intermediate said upper tube sheet and the upper ends of said baffles, means to withdraw gas from the space within said shell above said lower ends of said granular solid feed tubes, a plurality of granular solid withdrawal tubes depending from said lower tube sheet and means to equalize flow of granular solids from the lower ends of said withdrawal tubes.

5. Apparatus for heating granular solids comprising a vertical shell, an upper tube sheet extending across said shell near the upper end thereof, to provide a feed hopper in the top of said shell, means to admit granular solids to said hopper, an upper gas supply manifold below said tube sheet, a lower tube sheet extending across said shell near the lower end thereof, a lower gas supply manifold below said lower tube sheet, a plurality of gas feed tubes extending between said manifolds, a plug in each of said gas feed tubes in the lower portion thereof to divide said tube into two feed compartments, each communicating with one of said manifolds, a helical baffle about each of said gas feed tubes having its upper surface sloping downwardly away from said gas feed tube, at least one orifice in each of said tubes below said plug and under said baffle to admit gas from said lower manifold to the space under the lower ends of said baffles, a plurality of orifices in each of said tubes above said plug spaced along said tubes under said baffles to admit gas from said upper manifold in increments to the space under said baffles, a plurality of granular solid feed tubes depending from said upper tube sheet and having their lower ends spaced among said gas feed tubes, means to withdraw gas from the space within said shell above said lower ends of said granular solid feed tubes, a plurality of granular solid withdrawal tubes depending from said lower tube sheet and means to equalize flow of granular solids from the lower ends of said withdrawal tubes.

6. Apparatus for heating granular solids comprising a vertical shell, an upper tube sheet extending across said shell near the upper end thereof, to provide a feed hopper in the top of said shell, means to admit granular solids to said hopper, an upper gas supply manifold adjacent said tube sheet, a lower tube sheet extending across said shell near the lower end thereof, a lower gas supply manifold adjacent said lower tube sheet, a plurality of gas feed tubes extending between said manifolds, a plug in each of said gas feed tubes in the lower portion thereof to divide said tube into two feed compartments, each communicating with one of said manifolds, a helical baffle about each of said gas feed tubes having its upper surface sloping downwardly away from said gas feed tube, at least one orifice in each of said tubes below said plug and under said baffle to admit gas from said lower manifold to the space under the lower ends of said baffles, a plurality of orifices in each of said tubes above said plug spaced along said tubes under said baffles to admit gas from said upper manifold in increments to the space under said baffles, a plurality of granular solid feed tubes depending from said upper tube sheet and having their lower ends spaced among said gas feed tubes, means to withdraw gas from the space within said shell above said lower ends of said granular solid feed tubes, a plurality of granular solid withdrawal tubes depending from said lower tube sheet and means to equalize flow of granular solids from the lower ends of said withdrawal tubes.

7. Apparatus for heating granular solids comprising a vertical shell, an upper tube sheet extending across said shell near the upper end thereof, to provide a feed hopper in the top of said shell, means to admit granular solids to said hopper, an upper gas supply manifold below said tube sheet, a lower tube sheet extending across said shell near the lower end thereof, a lower gas supply manifold below said lower tube sheet, a plurality of gas feed tubes extending between said manifolds, a plug in each of said gas feed tubes in the lower portion thereof to divide said tube into two feed compartments, each communicating with one of said manifolds, a helical baffle about each of said gas feed tubes having its upper surface sloping downwardly away from said gas feed tube, the upper ends of said helical baffles being spaced a substantial distance from the adjacent ends of said gas feed tubes, at least one orifice in each of said tubes below said plug and under said baffle to admit gas from said lower manifold to the space under the lower ends of said baffles, a plurality of orifices in each of said tubes above said plug spaced along said tubes under said baffles to admit gas from said upper manifold in increments to the space under said baffles, a plurality of granular solid feed tubes depending from said upper tube sheet and having their lower ends spaced among said gas feed tubes intermediate said upper manifold and the upper ends of said baffles, means to withdraw gas from the space within said shell above said lower ends of said granular solid feed tubes, a plurality of granular solid withdrawal tubes depending from said lower tube sheet and means to equalize flow of granular solids from the lower ends of said withdrawal tubes.

8. Apparatus for heating granular solids comprising a vertical shell, a plurality of vertical gas feed tubes within said shell a plug in each of said gas feed tubes in the lower portion thereof to divide said tube into two feed compartments, upper and lower manifold means to supply gaseous material to the ends of said gas feed tubes, a helical baffle about each of said gas feed tubes having its upper surface sloping downwardly away from said gas feed tube, the ends of said helical baffles being spaced a substantial distance from the adjacent ends of said gas feed tubes, at least one orifice in each of said tubes below said plug and under said baffle to admit gas from said lower manifold to the space under the lower ends of said baffles, a plurality of orifices in each of said tubes above said plug spaced along said tubes under said baffles to admit gas from said upper manifold in increments to the space under said baffles, means to supply granular solids to the top of said shell, means to withdraw granular solids from the bottom of said shell, and means to withdraw gases from within said shell.

9. Apparatus for heating granular solids comprising a vertical shell, a plurality of vertical gas feed tubes within said shell, a plug in each of said gas feed tubes in the lower portion thereof to divide said tube into two feed compartments, upper and lower manifold means to supply gaseous material to the ends of said gas feed tubes, a helical baffle about each of said gas feed tubes having its upper surface sloping downwardly away from said gas feed tube, at least one orifice in each of said tubes below said plug and under said baffle to admit gas from said lower manifold to the space under the lower ends of said baffles, a plurality of orifices in each of said tubes above said plug spaced along said tubes under said baffles to admit gas from said upper manifold in increments to the space under said baffles, means to supply granular solids to the top of said shell, means to withdraw granular solids from the bottom of said shell, and means to withdraw gases from within said shell.

10. Apparatus for heating granular solids comprising a vertical shell, an upper tube sheet extending across said shell near the upper end thereof, to provide a feed hopper in the top of said shell, means to admit granular solids to said hopper, an upper gas supply manifold below said tube sheet, a lower tube sheet extending across said shell near the lower end thereof, a lower gas supply manifold below said lower tube sheet, a plurality of gas feed tubes extending between said manifolds, a plug in each of said gas feed tubes to divide said tube into two feed compartments, each communicating with one of said manifolds, a helical baffle about each of said gas feed tubes having its upper surfaces sloping downwardly away from said gas feed tube, at least one orifice in each of said tubes below said plug and under said baffle to admit gas from said lower manifold to the space under the lower ends of said baffles, at least one orifice in each of said tubes above said plug under said baffles to admit gas from said upper manifold, a plurality of granular solid feed tubes depending from said upper tube sheet and having their lower ends spaced among said gas feed tubes intermediate said upper manifold and the upper ends of said baffles, means to withdraw gas from the space within said shell above said lower ends of said granular solid feed tubes, a plurality of granular solid withdrawal tubes depending from said lower tube sheet and means to equalize flow of granular solids from the lower ends of said withdrawal tubes.

ERNEST UTTERBACK.

REFERENCES CITED

The following references are of record in the file of this patent:

UNITED STATES PATENTS

| Number | Name | Date |
| --- | --- | --- |
| 783,903 | Skoog | Feb. 28, 1905 |
| 1,448,340 | Fleischer | Mar. 13, 1923 |
| 1,554,780 | Berrigan | Sept. 22, 1925 |
| 1,611,098 | Borner | Dec. 14, 1926 |
| 2,227,416 | Payne | Dec. 31, 1940 |
| 2,399,450 | Ramseyer | Apr. 30, 1946 |